Figure 1:
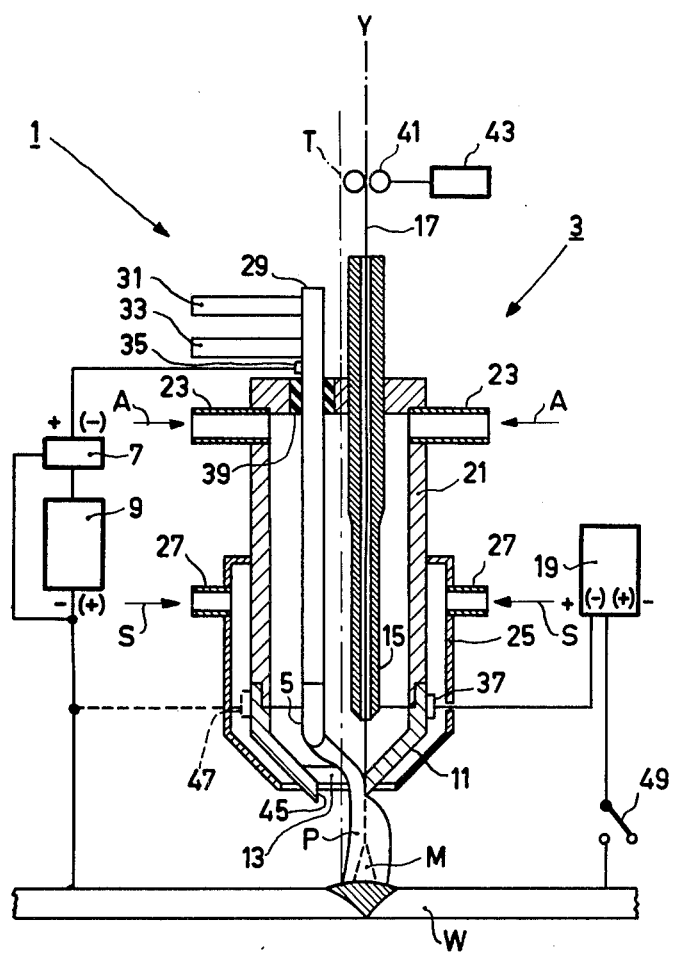

United States Patent [19]

Willems

[11] 4,205,215
[45] May 27, 1980

[54] METHOD AND DEVICE FOR WELDING IN A THERMALLY IONIZED GAS

[75] Inventor: Gerardus A. M. Willems, Eindhoven, Netherlands

[73] Assignee: U.S. Philips Corporation, New York, N.Y.

[21] Appl. No.: 871,712

[22] Filed: Jan. 23, 1978

Related U.S. Application Data

[63] Continuation of Ser. No. 778,602, Mar. 17, 1977, abandoned.

[30] Foreign Application Priority Data

Mar. 31, 1976 [NL] Netherlands .......................... 7603320

[51] Int. Cl.² .................................................. B23K 9/00
[52] U.S. Cl. ................................ 219/121 P; 219/75; 219/76.16
[58] Field of Search ............. 219/76.16, 121 P, 121 R, 219/75; 313/231.4

[56] References Cited

U.S. PATENT DOCUMENTS

| | | | |
|---|---|---|---|
| 2,982,845 | 5/1961 | Yenni et al. | 219/76.16 |
| 3,041,672 | 7/1962 | Lyle | 219/121 P |
| 3,312,566 | 4/1967 | Winzeler et al. | 219/121 P |
| 3,818,175 | 6/1974 | Essers et al. | 219/121 P |
| 4,016,397 | 4/1977 | Essers et al. | 219/121 P |
| 4,087,671 | 5/1978 | Essers | 219/121 P |

FOREIGN PATENT DOCUMENTS 1444880  6/1976  United Kingdom ................ 219/121 P

*Primary Examiner*—B. A. Reynolds
*Assistant Examiner*—Mark Paschall
*Attorney, Agent, or Firm*—Thomas A. Briody; William J. Streeter; Rolf E. Schneider

[57] ABSTRACT

A plasma-MIG welding system in which the power for establishing the MIG-arc is supplied to the consumable electrode at a point downstream of the non-consumable electrode.

8 Claims, 5 Drawing Figures

METHOD AND DEVICE FOR WELDING IN A THERMALLY IONIZED GAS

This is a continuation of application Ser. No. 778,602 filed on Mar. 17, 1977, now abandoned.

This invention relates to a method of welding in a thermally ionized gas, a MIG-arc being maintained between a continuously-fed consumable electrode and a workpiece in a gas plasma which is produced by a plasma arc which is maintained in a gas flow between a non-consumable plasma electrode and a second electrode.

A method of this kind, known as the plasma-MIG-welding process, is already known from U.S. Pat. No. 3,891,824. According to this known method, the welding current if fed via a contact tube to the consumable electrode upstream of the nozzle, the part of the consumable electrode which is present at the level of the plasma electrode then being current-carrying, so that electromagnetic interaction occurs between the gas plasma and the current-carrying consumable electrode. This interaction may give rise to instability of the plasma arc; which instability may have two aspects, i.e.:

(a) Contraction of the gas plasma around the consumable electrode, so that the voltage across the plasma arc is increased. This is a detrimental effect, because generally a less steep part of the drooping voltage characteristic of the plasma power supply souce is used for the plasma arc and such detrimental effect makes the continued maintenance of the plasma arc less reliable.

(b) Climbing of the contracted gas plasma along the consumable electrode which, in the case of positive polarity of the consumable electrode (relative to the workpiece), causes additional and undesired heat development and may cause and initiate the formation of a cathode (relative to the plasma electrode) on the consumable electrode, so that the plasma arc is not directed to the workpiece but rather to the nearer consumable electrode. The latter is a very undesirable phenomenon, because the welding process is affected and usually a disturbance occurs in the continuity of the process.

According to the known method it has been possible to maintain the stability of the plasma arc in the case of negative polarity, notably if the cathode formation on the consumable electrode is stimulated by the addition of some oxygen or $CO_2$ to the plasma gas, but stability is not obtained if the potentials of the contact tube and the plasma electrode are not adapted to each other within comparatively narrow limits. Complete or partial current transfer from the plasma electrode to the consumable electrode instead of to the workpiece again readily occurs, which is undesirable and which usually leads to disturbances because the plasma arc, driven by electromagnetic forces, travels further upwards between the plasma electrode and the contact tube, even so far that these parts are destroyed so that leakage usually occurs.

According to the known method, in which current is fed to the consumable electrode via a contact tube, this tube is usually situated above the nozzle outside the range of action of the arc plasma and usually upstream of the end of the plasma electrode. A problem then occurs in that the extension of the consumable electrode, i.e. the current-carrying portion thereof between the contact tube and its free end, is comparatively large, which is detrimental in certain cases.

The present invention has for its object at least to mitigate these drawbacks, to improve the plasma-MIG-welding process, and to enlarge its range of applications.

This object is achieved in accordance with the invention in that the welding current is fed to the consumable electrode downstream of the plasma electrode.

Surprisingly, it has been found that the fact that the current feed to the consumable electrode takes place in the gas plasma itself has no detrimental effect on the welding process. On the contrary, in the case of positive polarity as well as in the case of negative polarity of the plasma electrode and of the consumable electrode, the advantages obtained are evident. When the step in accordance with the invention is taken, the part of the consumable electrode at the level of the plasma electrode is not current-carrying, so that instability of the plasma arc due to magnetic interaction between the gas plasma and the consumable electrode is prevented. Consequently, the plasma electrode as well as the guide for the consumable electrode can be arranged nearer to the nozzle and the extension, i.e. the current-carrying portion of the consumable electrode can be reduced.

A further advantage is very evident in the case of welding with negative polarity of the plasma electrode and the consumable electrode. Even if a discharge should occur between the plasma electrode and the consumable electrode, this discharge would not tend to travel upwards. On the contrary, the discharge will rather travel in the direction of the workpiece. A partial or complete discharge between the plasma electrode and the consumable electrode then even occurs in a stable manner should the welding circumstances change, accidentally or intentionally, so that the plasma arc between the plasma electrode and the workpiece cannot be maintained or only with great difficulty, whilst the discharge between the consumable electrode and the workpiece is maintained. This may occur, for example, if the working distance between the welding torch and the workpiece is increased beyond given limits. When the normal working distance is restored, the plasma arc will be spontaneously struck again towards the workpiece. This is a major advantage which is of essential importance if the welding torch is held by hand. This is possible because the anode formation of the plasma arc on the consumable electrode or on the workpiece is very smooth; when use is made of the method in accordance with the invention, full advantage can be taken of this aspect, because the discharge between the plasma electrode and the consumable electrode is then stable. A major advantage consists in the fact that the plasma arc cannot be extinguished during welding by a disturbance of some kind as may occasionally occur when use is made of the known method. Moreover, it has been found that when use is made of the method in accordance with the invention, it is no longer necessary to adjust the consumable electrode and the plasma electrode potentials exactly to each other in order to prevent disturbances or to obtain a satisfactory welding process. The range within which satisfactory transfer of material takes place is much larger. This is probably due to the shorter extension of the consumable electrode, so that a voltage gradient across the consumable electrode occurs to a lesser degree.

In the case of positive polarity of the plasma electrode and the consumable electrode, the short extension of the consumable electrode may be of importance, because this inter alia enables further penetration of the workpiece than in the case of a large extension of the consumable electrode. The rotation of the MIG-arc which occurs when use is made of the known method then takes place at a higher transition current intensity of the welding current so enabling larger welding currents below this transition current intensity for the same deposited quantity of electrode material, as a result of the reduced resistance heating of the consumable electrode and the reduced heating in the gas plasma. Such a stabilization of the plasma arc as achieved with negative polarity is not achieved with positive polarity, but it is often possible to select a more favourable position of the plasma electrode relative to the plasma aperture, because a smaller distance between the plasma electrode and the consumable electrode does not give rise to disturbances.

According to a preferred method in accordance with the invention, the welding current is fed to the consumable electrode via a contact area which is situated in a thermally ionized gas atmosphere. Such an "open" contact area which is flushed by a gas plasma has more favourable current feeding properties than a closed contact area as in the case of a contact tube or a contact ring.

According to a preferred method, where the gas flow is guided through the plasma aperture of a nozzle, the consumable electrode is brought into contact with the nozzle, the welding current being supplied to the consumable electrode via the nozzle.

The invention also relates to a welding torch for performing the method; this weldig torch comprises a housing with a non-consumable plasma electrode, a wire guide and a connection for the supply of a plasma gas; characterized by a contact member having a contact face which is arranged downstream of the plasma electrode, at least part of the contact face being substantially in alignment with the centre line of the wire guide.

For the contact member use can be made of any convenient element, provided that it is suitably cooled so that it can withstand the combination of heat development by the current transition and by heat transfer from the gas plasma.

A preferred embodiment of the welding torch in accordance with the invention is characterized by a nozzle with a plasma aperture, said nozzle acting as the contact member, the wire guide being eccentrically arranged relative to the plasma aperture, and the centre line of the wire guide being substantially in alignment with a point on the circumference of the plasma aperture. The nozzle is very suitable for use as contact member, because it is usually cooled very well. The plasma aperture of this embodiment may have a circular or oval shape.

It has been found that the asymmetrical arrangement of the wire guide relative to the nozzle does not affect the welding process. Evidently, the electromagentic field of the current-carrying portion of the welding wire outside the nozzle symmetrically distributes the gas plasma around this extending portion.

A further advantage of the use of the nozzle as the contact member consists in that the supply of the welding current to the contact area on the nozzle is effected via the wall of the housing of the torch. As a result, the supply of current to the welding wire will cause no, or only a weak, magnetic field to prevail in the interior of the housing where the plasma electrode is situated, so that the effect of the current through the welding wire on the part of the plasma arc which is present in the torch is minimized.

A further embodiment of the welding torch in accordance with the invention is characterized by a nozzle with a plasma aperture, said nozzle acting as the plasma electrode, the contact member being arranged downstream of the nozzle. As a result, the contact member will be situated comparatively near to the workpiece, so that the current-carrying part of the welding wire, and hence its extension, are extremely short.

The invention also relates to apparatus for performing the method in accordance with the invention, which comprises a welding torch, having a non-consumable plasma electrode, a wire guide, and means for the supply of a plasma gas; and a power supply source whereto the plasma electrode is connected; characterized by a contact member having a contact surface arranged downstream of the plasma electrode and connected to a second power supply source, at least part of said contact surface being substantially in alignement with the centre line of the wire guide.

In a preferred embodiment of the apparatus in accordance with the invention, in which the torch has a nozzle with a plasma aperture, the nozzle is connected to the second power supply source, the centre line of the wire guide being substantially in alignment with a point on the periphery of the plasma aperture. As a result of the use of the nozzle as the contact member, separate contact means can be dispensed with. This apparatus is suitable for welding with a transferred as well as with a non-transferred plasma arc. The transferred plasma arc is maintained between the plasma electrode and a workpiece which acts as a second electrode. The non-transferred plasma arc is maintained between the plasma electrode and a second electrode other than the workpiece; for example the nozzle, an annular electrode arranged upstream or downstream of the nozzle, or a separate rod electrode.

In a further preferred embodiment of the apparatus in accordance with the invention, the two power supply sources are connected in series, the nozzle also being connected to the first power supply source whilst a switch is connected to the second power supply source. As a result of this step, the welding process can be started in a simple manner by first igniting a non-transferred plasma arc, followed by welding, after the striking of the MIG-arc, with a transferred plasma arc.

A further preferred embodiment provides a simpler and less costly apparatus in that the first power supply source is formed by a transformer, the nozzle being provided with an auxiliary electrode.

Yet a further preferred embodiment of the apparatus in accordance with the invention, in which the torch has a nozzle with a plasma aperture, is characterized in that the contact member is arranged downstream of the nozzle. Welding with an extremely short extension of the welding wire is possible when the contact member is arranged between the nozzle and the workpiece.

A further preferred embodiment provides a very compact and simple device, in that the nozzle is connected to the first power supply source and thus acts as a non-consumable plasma electrode. A separate plasma electrode can thus be dispensed with.

The invention will now be described in detail with reference to the accompanying drawings, of which FIG. 1 shows a practical embodiment of the apparatus in accordance with the invention;

FIGS. 2 to 5 diagrammatically show further embodiments of apparatus for performing the method in accordance with the invention. Corresponding elements are denoted by corresponding references in the Figures.

FIG. 1 shows welding apparatus 1 comprising a welding torch 3 having a non-consumable plasma electrode centre line T of the housing 21 of the welding torch. The housing 21 comprises a nozzle 11 with a plasma aperture 13 and connections 23 for the supply of an inert gas flow A. A shielding gas S can be supplied via connections 27 in a shield 25. The plasma electrode 5, being made of tungsten in the present example, is mounted on a copper holder 29 which is cooled via cooling water connections 31 and 33 and cooling ducts (not shown). The nozzle 11 and the housing 21 are provided with cooling ducts (not shown) in a conventional manner. The electrode holder 29 is connected, by means of a connection terminal 35, via an HF-generator 7 to one of the two poles of a first power supply source 9, the other pole of which is connected to a workpiece W. By means of a connection terminal 37, the nozzle 11 is connected to one of the poles of a second power supply source 19, the other pole of which is connected to the workpiece W. The holder 29 is insulated relative to the housing 21 by means of an insert 39 of a synthetic material. The transport of a welding wire 17 to e deposited is effected by means of rollers 41 which are driven at a controllable speed by a motor 43. The wire guide 15 is arranged relative to the nozzle 11 so that the centre line Y of the wire guide is substantially in alignment with a point on the inner circumference 45 of the nozzle 11 which bounds the plasma aperture 13, so that the welding wire 17 contacts the inner circumference 45 of the nozzle which serves as a contact member for feeding the welding current to the welding wire. Welding can be effected with either positive or negative polarity of the welding wire, the nozzle, and the plasma electrode 5 and the workpiece W is ignited by means of a high frequency discharge and is maintained by the power supply source 9. Subsequently, the welding wire 17 can be supplied, after the striking of a MIG-arc M between the welding wire and the workpiece; the welding wire being maintained at a suitable potential by the power supply source 19.

Positive polarity has an advantage over negative polarity in that the welding process is smoother in the high current range, for example, above 225 A. An advantage of negative polarity over positive polarity consists in that the stability of the plasma is ensured as long as the electrical discharge from welding wire to workpiece takes place. Another advantage in certain cases consists in that the material transfer disturbs the molten pool less and in that the root of the combined arc on the molten pool is more regularly distributed and hence has a less disturbing effect on the surface of the weld.

For both polarities, welding with a non-transferred plasma arc between the plasma electrode 5 and the nozzle 11 is alternatively possible. For this it is sufficient to connect the power supply source 9 for the plasma arc, by means of a connection terminal 47, to the nozzle 11 instead of to the connection on the workpiece W, so that the two power supply sources 9 and 19 are then connected in series. It may be advantageous for the plasma arc to be completely independent of the workpiece. In the latter embodiment with a non-transferred plasma arc between the plasma electrode and the nozzle, the simple introduction of a switch 49 between the workpiece W and the second power supply source 19 for the MIG-arc M offers substantial advantages. When the switch 49 is open, a plasma arc which is not transferred to the workpiece W is struck between the plasma electrode 5 and the nozzle 11. When the feeding of the welding wire 17 starts, the switch 49 is closed in order to establish the connection workpiece-current source-nozzle-welding wire, and to bring the welding wire to a suitable potential relative to the workpiece. As a result, the plasma electrode is then also at a higher potential relative to the workpiece. Consequently, the plasma arc starting from the plasma electrode 5 jumps from the nozzle 11 to the workpiece W, and the discharging from the welding wire 17 to the workpiece W commences immediately. When the wire feed stops and the swtich 49 is interrupted, the plasma arc automatically returns to the non-transferred form between the plasma electrode 5 and the nozzle 11. The device is then ready for renewed starting of the welding process, so that ignition of the plasma by means of a high frequency discharge is no longer required.

Figure 2:
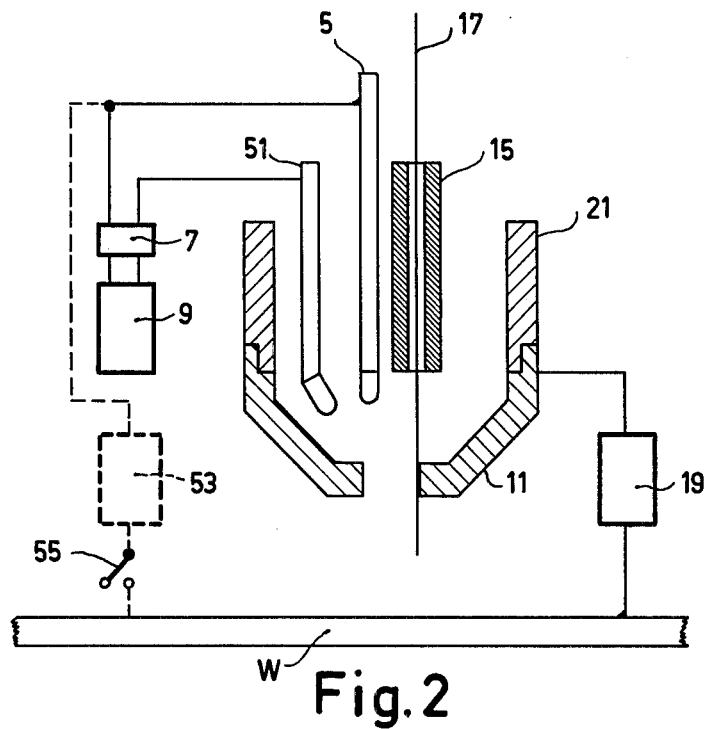
Figure 3:
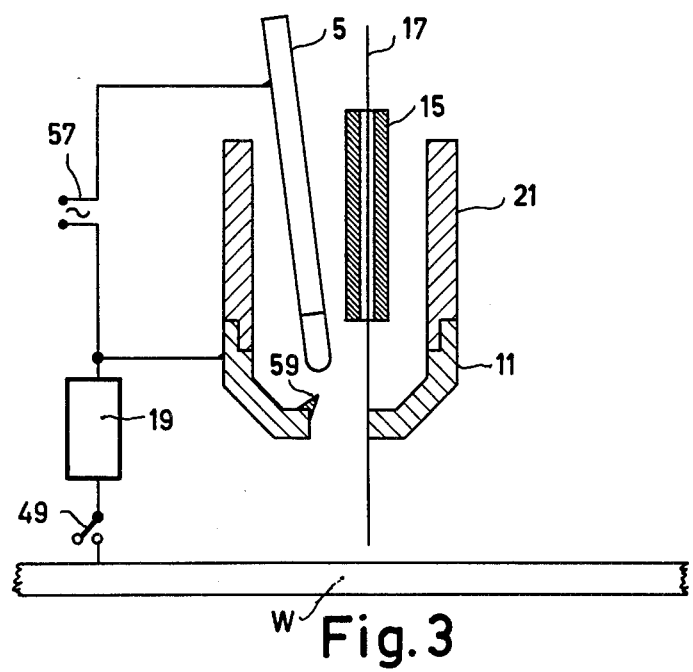

As shown in FIG. 2, the nozzle of the described embodiment with a non-transferred plasma arc between the plasma electrode 5 and the nozzle 11, via the connection terminal 47, can be replaced in a manner known per se by a second plasma electrode 51 in the housing 21, the non-transferred plasma arc then being maintained between the two plasma electrodes 5 and 51. If both plasma electrodes 5 and 51 are made of tungsten, the power supply source 9 may consist of a transformer. If a third power supply source 53 is connected to one of the two plasma electrodes and to the workpiece W via a switch 55, the stability of the plasma arc between the plasma electrode 5 and the workpiece W is ensured by the simultaneous presence of the plasma arc between the two plasma electrodes 5 and 51 in the housing 21 which is not transferred to the workpiece. This is because, should the plasma arc to the workpiece extinguish due to a disturbance during welding, it would immediately be ingited again by the flow of thermally ionized gas produced by the plasma arc between the two plasma electrodes, which is independent of the workpiece.

Normally, welding is effected with direct current for the welding wire as well as for the plasma arc. The embodiment which is denoted in FIG. 1 by broken lines and which comprises the two series-connected power supply sources 9 and 19 and the switch 49, can be made simpler and less costly by replacement of the rectifier of the first power supply source 9 by a less expensive transformer 57 (FIG. 3); an auxiliary electrode 59 of tungsten then being arranged on the inner side of the nozzle 11. By means of a brief high-frequency discharge, a non-transferred alternating current arc is ignited between the plasma electrode 5 and the auxiliary electrode 59. Because two tungsten electrodes are involved, the alternating current arc can be maintained by the transformer 57 without high-frequency discharge. The argon gas flow introduced into the housing 21 blows the arc plasma through the nozzle 11 to the workpiece W. The device is then ready for the starting of the plasma-MIG process without further HF-discharge. To this end, the feeding of the welding wire 17 is started, the said wire nozzle 11, to the positive pole of the direct current source 19, the negative pole of which is connected to the workpiece W. It has been found that upon closing of the switch 49 a transferred plasma arc is formed between the electrode 5 and the workpiece W and that the discharging of the welding wire 17 therein is promptly ignited and maintained. Once the direct current discharging of the welding wire 17 has been ignited, a cathode is permanently present on the workpiece W, so that the discharging from the plasma electrode 5 to the workpiece W is always readily ignited during the positive period.

During the negative period of the plasma electrode 5, the plasma arc is constantly present between the plasma electrode and the nozzle. It is surprising that the initial ignition of the transferred plasma arc is so smoothly achieved, because a cathode spot must be formed on the workpiece. The presence of the thermally ionized gas of the non-transferred plasma arc and the increase of the potential of the plasma electrode during the positive period with the voltage of the direct current source 19 evidently suffice for this purpose. In spite of the fact that only half the plasma flow flows to the workpiece, so that the heating of the weld is less than in the case of a direct current plasma arc, the difference in the welding result is only small. When the wire feed terminates and the switch 49 is opened, a non-transferred alternating current plasma arc remains in which starting can be readily effected again.

All those circuits have been successfully used for performing welding tests with wire currents of between 50 A and 500 A and plasma currents of between 50 A and 300 A. Welding wires of steel, stainless steel, copper and aluminium, with diameters of from 1.6 to 0.9 mm were deposited.

Figure 4:
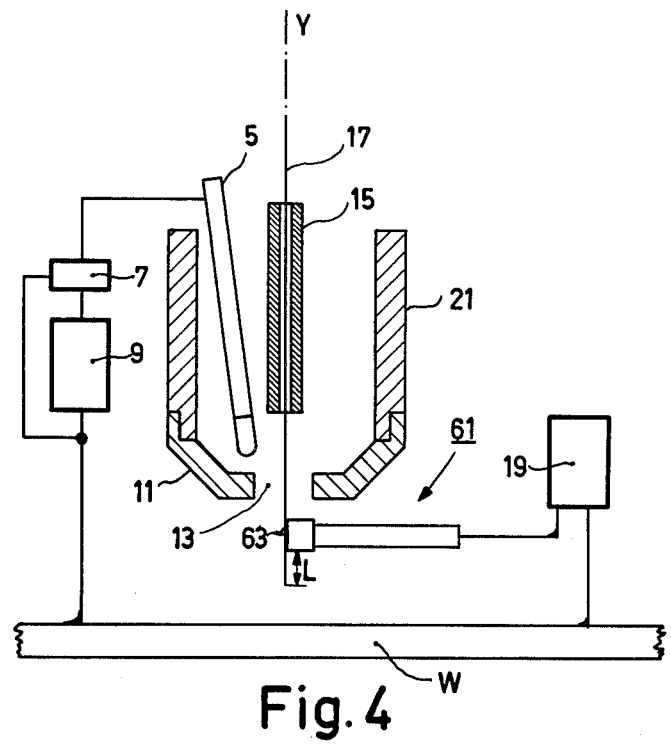

FIG. 4 shows an embodiment in which a separate contact member 61, connected to the second power supply source 19, is arranged between the nozzle 11 and the workpiece W. The contact member comprises a contact face 63 which is parallel to the center line Y of the wire guide 15; the contact member is arranged so that the contact face 63 is substantially in alignment with the center line Y. The extension L of the welding wire 17, i.e. the current-carrying portion between the contact member and the free end of the welding wire is extremely short in this embodiment. The contact member 61 should be properly cooled and can be provided with cooling ducts (not shown) for this purpose.

Figure 5:
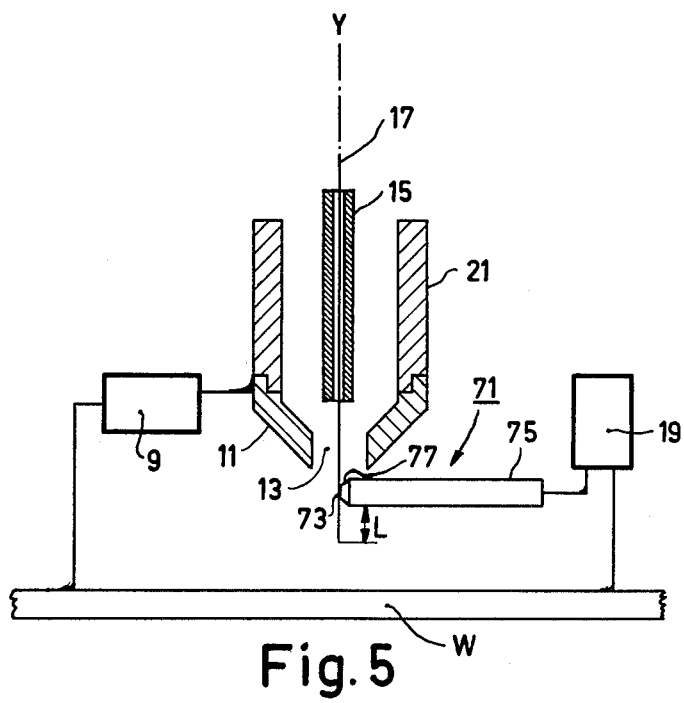

The embodiment shown in FIG. 5 comprises a contact member 71 consisting of a water-cooled copper holder 75 and a tungsten portion 77 with a contact face 73. The nozzle 11 is connected to the first power supply source 9 and serves as a plasma electrode; a separate plasma electrode in the housing 21 is thus eliminated. A high-frequency generator is also no longer required in this embodiment, because the plasma arc is spontaneously ignited by the MIG-arc which can be ignited by bringing the welding wire into contact with the workpiece.

What is claimed is:

1. A method of plasma-MIG welding, which comprises flowing a thermally ionizable inert gas past a non-consumable electrode out through a nozzle toward a workpiece; establishing a plasma arc between said non-consumable electrode and said workpiece to initiate and sustain a plasma flow; feeding a consumable electrode in an axial direction through said plasma flow and out through said nozzle toward the workpiece; establishing a MIG-arc between said consumable electrode and said workpiece; and supplying power for establishing said MIG-arc to the consumable electrode at a point downstream of said non-consumable electrode.

2. A method according to claim 1, in which the consumable electrode is fed out through the nozzle in contact with the same, and the power is supplied to the consumable electrode through the nozzle.

3. A method according to claim 1, in which the consumable electrode is axially fed out through the nozzle, and the power is supplied to the consumable electrode in a region separated from the nozzle.

4. A method according to claim 3, in which the power is supplied to the cnosumable electrode at a point between the nozzle and the workpiece.

5. A plasma-MIG welding torch, which comprises a housing provided with a nozzle; a non-consumable electrode disposed in said housing; first means associated with said non-consumable electrode to supply power thereto; means to feed a consumable electrode in an axial direction through said housing and out through said nozzle; and second means to supply power to said consumable electrode at a point downstream of said non-consumable electrode.

6. A welding torch according to claim 5, in which the feeding means feeds the consumable electrode out through the nozzle in contact therewith, and the second means supplies power to the consumable electrode through said nozzle.

7. A welding torch according to claim 5, in which the feeding means feels the consumable electrode axially out through the nozzle, and the second means supplies power to the consumable electrode at a point downstream of the nozzle.

8. A welding torch according to claim 6, in which the first means also supplies power to the nozzle, whereby said first means and said accord means are connected in series through the nozzle.

* * * * *